United States Patent [19]
Ferguson et al.

[11] 3,742,720
[45] July 3, 1973

[54] QUANTITATIVE RECOVERY OF KRYPTON FROM GAS MIXTURES MAINLY COMPRISING CARBON DIOXIDE

[75] Inventors: Don E. Ferguson; Paul A. Haas, both of Knoxville; Rex E. Leuze, Lenoir City, all of Tenn.

[73] Assignee: The United States of America as represented by the United States Atomic Energy Commission, Washington, D.C.

[22] Filed: July 25, 1972

[21] Appl. No.: 275,001

[52] U.S. Cl. .............................. 62/17, 62/22, 55/66
[51] Int. Cl. ............................. F25j 3/02, F25j 3/08
[58] Field of Search ................... 62/17, 20, 22, 23, 62/24, 27, 28; 55/66

[56] References Cited
UNITED STATES PATENTS

| | | | |
|---|---|---|---|
| 2,551,399 | 5/1951 | Silverberg | 62/20 |
| 2,962,868 | 12/1960 | Dennis | 62/20 |
| 2,502,282 | 3/1950 | Schlitt | 62/22 |

Primary Examiner—Norman Yudkoff
Assistant Examiner—Arthur F. Purcell
Attorney—Roland A. Anderson

[57] ABSTRACT

A continuous process for the quantitative recovery of krypton from a feed gas mainly comprising carbon dioxide and also containing minor percentages of oxygen and nitrogen, as well as trace quantities of krypton. The process includes three principal separations: absorption of krypton from the feed gas to provide a krypton-decontaminated waste gas; fractionation of the gases co-absorbed with the krypton; and stripping of the krypton from the absorbent to provide (a) krypton-free carbon dioxide for use as the process absorbent and (b) krypton-enriched liquid product. The carbon dioxide absorbent is derived from the feed gas itself.

10 Claims, 2 Drawing Figures

SOLUBILITY OF KR IN LIQUID $CO_2$ 3,742,720

QUANTITATIVE RECOVERY OF KRYPTON FROM GAS MIXTURES MAINLY COMPRISING CARBON DIOXIDE

This invention was made in the course of, or under, a contract with the United States Atomic Energy Commission.

This invention relates generally to processes for the separation of a noble gas from a mixture of gases, the noble gas being more volatile than some of the constituents of the mixture and less volatile than others. More specifically, this process relates to recovering radioactive krypton in highly concentrated form from a gas mixture which mainly comprises carbon dioxide but which also contains smaller percentages of oxygen and nitrogen as well as trace quantities of krypton-85 and xenon.

A previously proposed method for the re-processing of irradiated nuclear fuel calls for burning all or part of the carbon blocks which contain the fuel. The off-gas from the burning operation consists mainly of carbon dioxide ($CO_2$) and contains minor percentages of oxygen ($O_2$) and nitrogen ($N_2$), as well as trace quantities of radioactive krypton (Kr), xenon (Xe), and iodine ($I_2$). In some instances, the off-gas also may contain a small percentage of carbon monoxide (CO).

The above-mentioned method for fuel re-processing calls for delaying the burning of the irradiated fuel blocks until sufficient time has elapsed for the decay of much of the radioactive iodine and essentially all of the radioactive xenon. This simplifies processing of the off-gas from the burning operation, since the iodine then can be removed by comparatively simple techniques and since removal of the xenon from the off-gas no longer is necessary. After an iodine-removal step, the burner off-gas would be decontaminated with respect to the $^{85}$Kr (half-life, 10.76 years) and then disposed of by release to the atmosphere. Preferably, the $^{85}$Kr would be recovered continuously in a highly concentrated (i.e., low-volume) form suitable for economical, long-term storage.

Quantitative recovery of the $^{85}$Kr from the burner off-gas is a difficult and unusual problem because the principal constituent, $CO_2$, is in various respects physically similar to Kr. Furthermore, the off-gas includes some constituents which, unlike $CO_2$, are more volatile than Kr. For example, following storage and iodine removal the off-gas may comprise approximately 90 mole % $CO_2$; 7 mole % $O_2$; 3 mole % $N_2$, <1 mole % CO; and trace quantities of Xe (10–100 ppm) and Kr (3 to 20 ppm). As mentioned, the Kr is more volatile than the $CO_2$ but less volatile than the $N_2$, $O_2$, and CO.

Various continuous methods have been considered for the quantitative recovery of the radioactive Kr from the burner off-gas. As used herein, "quantitative recovery" refers to recovery of at least 95 percent of the Kr in the feed gas to the process. Because of the physical similarity of Kr and $CO_2$, separation by means of membrane permeation, adsorption, or physical absorption is not attractive. Moreover, separation by means of thermal diffusion, hot-metal trapping or chemical reaction does not appear practical. Various processes are known for the removal of $CO_2$ by absorption in selective solvents but removal of $CO_2$ from the off-gas would still leave the Kr excessively diluted with $O_2$, $N_2$, and perhaps CO; thus, the Kr would not be recovered in a low-volume form permitting economical storage. Similarly, selective removal of the $CO_2$ from the feed gas by liquefaction would not provide a suitably concentrated product. Removal of the $^{85}$Kr from the off-gas can be accomplished by extraction into a fluorocarbon solvent, but this extraction is not attractive where $CO_2$ is present in large amounts, since the $CO_2$ would concentrate with the krypton. Low-temperature distillation might be used to separate purified $CO_2$ from the other components of the off-gas. Since CO may be present, such distillation would need to be preceded by an operation for the removal of CO or $O_2$ in order to ensure that the subsequent removal of $CO_2$ by distillation would not result in $CO-O_2$ concentrations within explosive limits. A potential problem inherent in krypton-removal processes conducted at liquid-oxygen temperatures is the formation of solid $CO_2$ in the process lines or columns. Another problem, imposed by the presence of appreciable $O_2$, is that the liquefaction of $^{85}$Kr along with appreciable amounts of $O_2$ may produce hazardous amounts of $O_3$ by radiolysis. Still another approach to the problem of recovering the $^{85}$Kr from burner off-gas would be to employ hot $K_2CO_3$ solution for the selective removal of the $CO_2$, but this leaves the Kr unseparated from the more volatile $N_2$, $O_2$, and CO.

SUMMARY OF THE INVENTION

Accordingly, it is an object of this invention to provide a novel process for the quantitative recovery of krypton from krypton-containing gas mixtures principally comprising carbon dioxide.

It is another object to provide a process for selectively recovering krypton from a krypton-containing gas mixture principally comprising carbon dioxide and also containing minor amounts of oxygen and nitrogen.

It is another object to provide a process of the kind described wherein the krypton is recovered in low-volume form.

It is another object to provide a krypton-recovering process which does not require operation at liquid-oxygen temperatures.

Other objects will be made apparent hereinafter.

This invention can be summarized as follows: A method for recovering krypton in highly concentrated form from a gas mixture constituted mainly of carbon dioxide and including a relatively small percentage of oxygen as well as a trace amount of krypton comprising (a) compressing and cooling said gas mixture to convert the same to a two-phase mixture including a gaseous fraction and a liquid fraction, both fractions containing carbon dioxide, oxygen, and kypton; (b) separating said gaseous fraction and liquid fraction; (c) passing said gaseous fraction upwardly through an absorption zone in countercurrent contact with krypton-decontaminated liquid carbon dioxide absorbent ultimately derived from said two-phase mixture to preferentially transfer krypton into said absorbent; (d) separately withdrawing the resulting krypton-decontaminated gaseous effluent from said zone; (e) passing said liquid fraction and the krypton-enriched liquid absorbent from said absorption zone downwardly through a fractionating zone in countercurrent contact with carbon dioxide vapor ultimately derived from said two-phase mixture to transfer oxygen into said vapor; (f) recycling at least a part of the resulting oxygen-enriched gaseous effluent upwardly through said absorption zone; (g) feeding the resulting oxygen-depleted, Krypton-containing liquid absorbent from said fractionating zone downwardly through a stripping zone in countercurrent contact with carbon dioxide vapor ultimately derived from said two-phase mixture to transfer krypton into said vapor; (h) recycling at least a part of the resulting krypton-decontaminated liquid absorbent downwardly through said absorption zone; (i) rectifying the resulting krypton-enriched vapor effluent from said stripping zone to provide a vapor stream further enriched in krypton; and (j) recovering as product at least a part of said stream further enriched in krypton.

BRIEF DESCRIPTION OF THE DRAWINGS

In FIG. 1, Y and X represent mole fractions of krypton in the gas and liquid phases, respectively.

DESCRIPTION OF TH PREFERRED EMBODIMENT

This invention will be illustrated in terms of a continuous process for the recovery of $^{85}Kr$ from a feed gas having the following composition per mole: $CO_2$, 0.897 mole; $O_2$, 0.0750 mole; $N_2$, 0.0280 mole. The feed gas also contains trace quantities of $^{85}Kr$ and Xe; these trace quantities are expressed herein as "K" mole and "X" mole, respectively. A feed gas of this composition is representative of burner off-gas (see above) which has been stored for a selected period and treated to remove certain other constituents. The process to be described is based on the preferential solubility of Kr in liquid $CO_2$ and is illustrated in terms of calculated ideal separation factors based on extrapolation of the Kr vapor pressure above the critical point.

In the process to be described, the liquid $CO_2$ absorbent is derived from the feed gas itself. The entire process system is conducted under pressure and temperature conditions ensuring that solidification of $CO_2$ is avoided. The process involves three principal separations having different liquid-gas flow rate limitations, and thus it is conducted conveniently in at least three liquid-gas contactors. By means of the three principal separations, the Kr is removed not only from the much larger quantities of the less-volatile $CO_2$ but also from the relatively large amounts of more-volatile $O_2$ and $N_2$. The particular form of the process to be described yields a low-volume product stream which contains (in terms of feed gas concentrations) about 99% of the Kr, less than 1% of the $CO_2$, and less than 1% of the $O_2$. More than 99% of the input $O_2$ and $N_2$ is vented as a waste gas decontaminated with respect to Kr. Liquid $CO_2$ in excess of that required to maintain a stable inventory is discharged from the system as a stream rich in Xe but decontaminated with respect to Kr.

Figure 1:
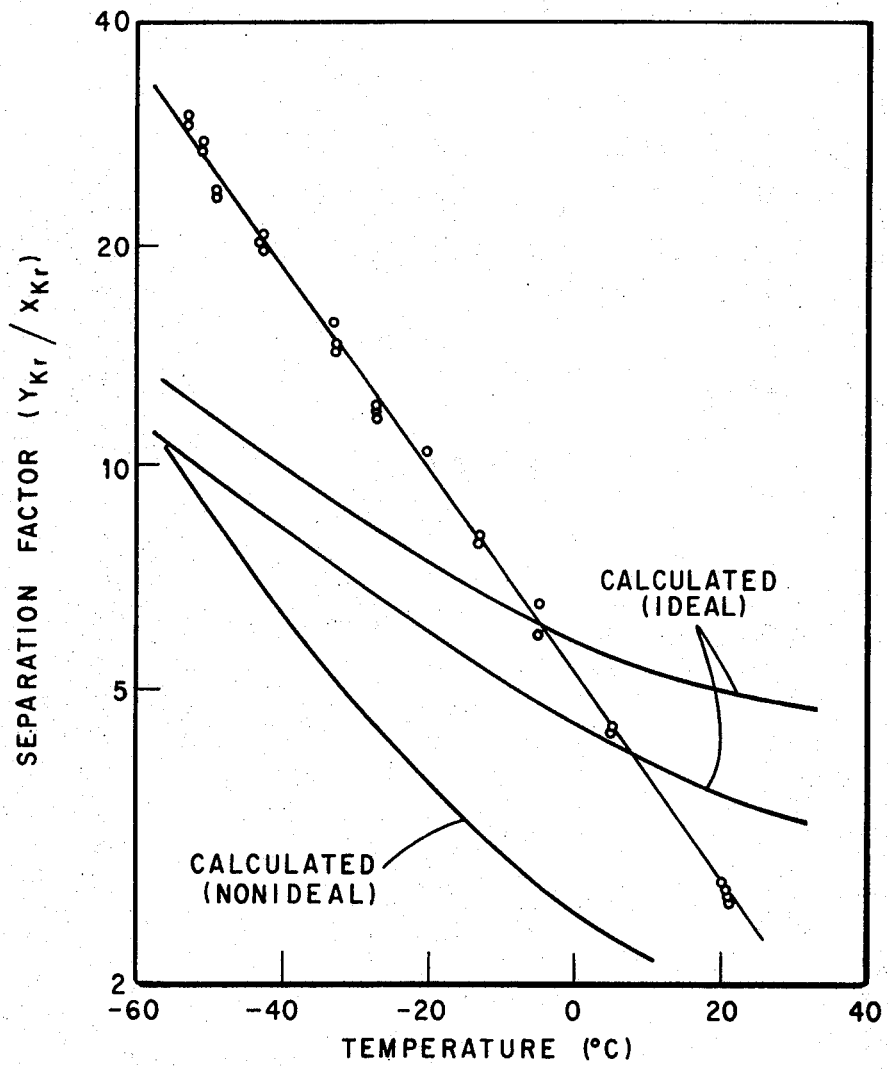
FIG. 1 is a graph correlating temperature and the distribution of krypton between gaseous and liquid $CO_2$. The graph includes a curve based on experimentally derived data obtained by in situ counting of $^{85}Kr$. It also includes curves based on calculated values assuming (a) ideality of both phases and (b) non-ideality of both phases.
Figure 2:
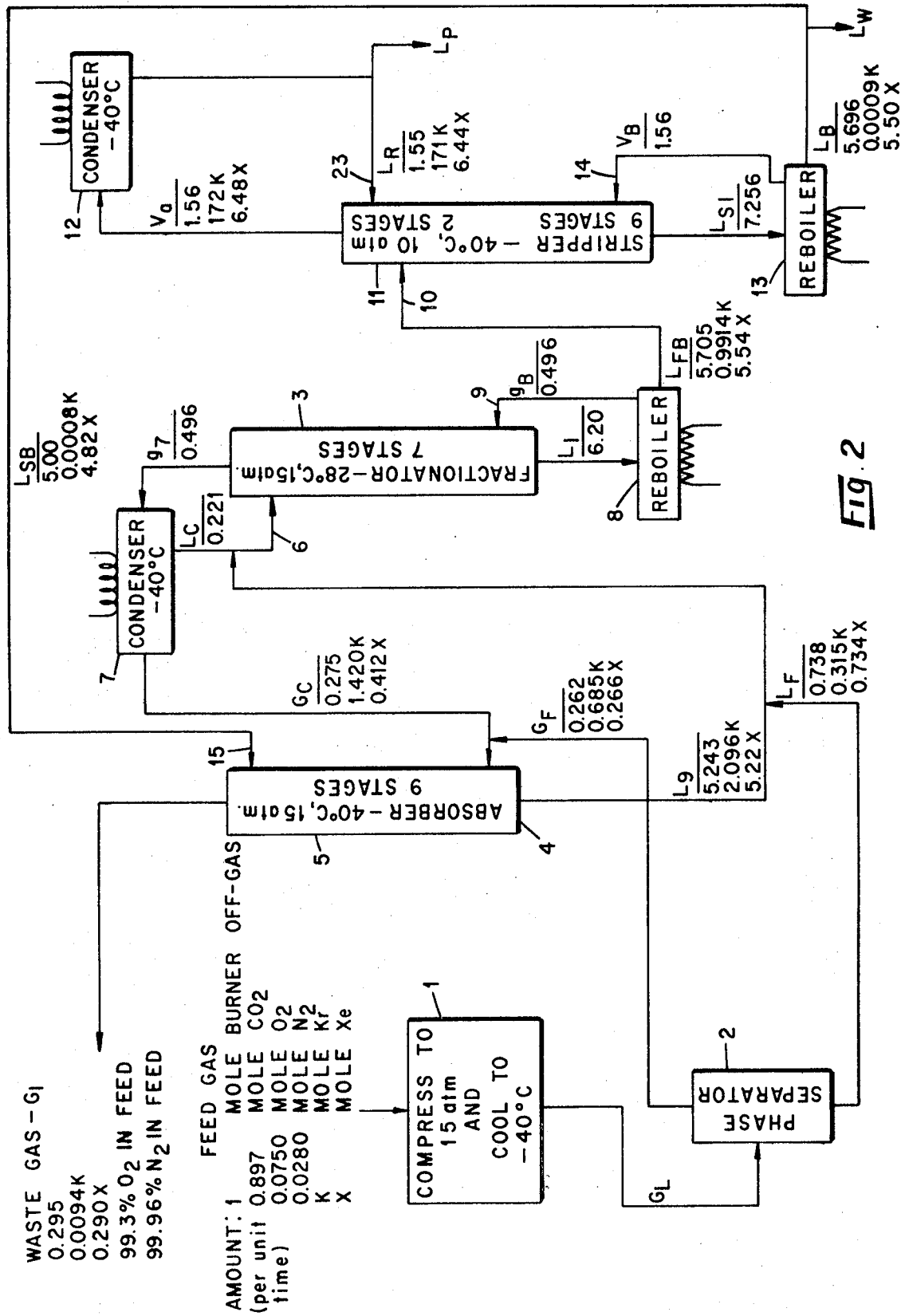
FIG. 2 is a flow diagram of a three-column, continuous process designed in accordance with this invention and directed to the quantitative removal of $^{85}Kr$ from gas evolved by the burning of irradiated graphite fuel blocks.

The accompanying flow diagram (FIG. 2) and the supplementary table appearing hereinafter illustrate the invention as employed for the treatment of one mole of the above-described feed gas per unit time. As shown, the feed gas first is compressed and cooled in any suitable apparatus 1 to liquefy a major portion (73.8 percent) thereof. The resulting two-phase mixture GL is fed to the bottom portion 4 of an absorption column 5, the bottom stage of which separates the mixture GL into a gaseous stream $G_F$ and a liquid stream $L_F$. As shown, a recycled gas stream $G_C$ from a fractionating column 3 also is fed into the bottom of the absorption column 5. To indicate the division of the two-phase stream GL into streams $G_F$ and $L_F$, a phase separator 2 is shown; actually, this separator is the bottom stage of absorption column 5. In FIG. 2 the flow rate of the stream $G_F$ is expressed as 0.262; 0.685K; and 0.266X. These figures indicate, respectively, the total moles flow per unit time of those constituents other than the trace elements Kr and Xe; the Kr flow in terms of K moles per unit time; and the Xe flow in terms of X moles per unit time.

The absorption column 5, which is designed with nine theoretical stages, can be of any suitable type, such as a conventional tower filled with standard packing. The gas upflow in this column comprises stream $G_F$ and the above-mentioned recycle stream $G_c$. The liquid effluent from this column comprises streams $L_F$ and $L_9$; these two streams, together with a stream of condensate $L_c$, are fed to an inlet 6 in the top portion of the fractionator 3. The gas introduced to the bottom of the absorption column 5 is contact countercurrently with Kr-decontaminated, liquid $CO_2$ absorbent introduced at an upper inlet 15. The contact is effected in an absorption zone maintained at a temperature of −40°C and a pressure of 15 atmospheres. This operation is designed to scrub approximately 99% of the Kr from the gas. The resulting gaseous effluent $G_1$, which contains more than 99% of the $N_2$ and $O_2$ in the original feed gas, is decontaminated sufficiently for discharge to atmosphere. The downflowing liquid $CO_2$ absorbent removes Xe even more effectively than it does Kr; because of recycle of the stream $G_c$, however, the waste gas $G_1$ contains about 29% of the original Xe.

The fractionating column 3 effects quantitative removal of $O_2$ and $N_2$ from the Kr-containing liquid introduced at the upper inlet 6. The fractionating column is of standard design and may be a conventional packed tower having seven theoretical stages. The column is provided with an overhead condenser 7 for receiving a gaseous stream $g_7$; it is also provided with a reboiler 8 for receiving a liquid stream $L_1$ from the bottom of the column. The feed to the upper inlet 6 of the column consists of the absorption column liquid effluent $L_9$, the aforementioned liquefied fraction $L_F$, and condensate $L_c$ from the condenser 7. As this feed flows down through the column, nearly all of the $O_2$ and $N_2$ dissolved therein is transferred into counterflowing $CO_2$ vapor from the reboiler 8, introduced to the column through a bottom inlet 9. In the fractionator, a part of the Kr in the downflowing liquid is transferred to the vapor. As shown, the gaseous effluent $g_7$ from the column is fed to the condenser 7. The major part of the Kr in the condenser feed is recycled to the absorption column 5 in the gaseous effluent $G_c$, and the remainder is refluxed to the fractionator in the condensate stream $L_c$. As shown, the fractionating zone is maintained at 15 atmospheres and about −28°C. A stream $L_{FB}$ of liquid is withdrawn continuously from the fractionator reboiler 8 and fed to a side inlet 10 of a tripping column 11. As shown in the table, stream $L_{FB}$ is mainly $CO_2$; the stream also contains appreciable amounts of dissolved Xe and Kr but only small fractions of the $O_2$ or $N_2$.

Expressed in terms of the original feed gas concentrations, the function of the stripping column 11 is to concentrate more than 99% of the Kr into about 1% of the $CO_2$. The stripper can be of any suitable design and may be a packed rectification column having nine stripping stages below the feed inlet 10 and two enriching stages above. The stripper is provided with an overhead condenser 12 for receiving a vapor stream $V_a$ and with a reboiler 13 for receiving a liquid stream $L_{S1}$ from the bottom of the column. A stream $V_B$ of vapor from the reboiler is introduced to the column through a lower inlet 14. The stripper is maintained at 10 atmospheres and $-40°C$.

In the stripping stages of column 11, the Kr-containing, liquid feed $L_{FB}$ is contacted countercurrently with vapor from the lower inlet 14. As a result, virtually all of the Kr is transferred into the vapor. The resulting liquid $CO_2$ effluent $L_{S1}$ contains only about 0.3% of the Kr in the feed gas, but, because of Xe recycle, about 8 times as much Xe as the feed gas.

A liquid stream $L_B$ is withdrawn continuously from the bottom of the reboiler 13. As shown in the table, this stream is highly pure $CO_2$ containing about 0.09% of the Kr in the feed gas and about 5.5 times the original amount of Xe. A major part $L_{SB}$ of this stream is recycled to the upper inlet 15 of the absorption column 5 for re-use as the process absorbent. Thus, the process absorbent is $CO_2$ derived originally from the above-mentioned two-phase mixture GL obtained by partial liquefaction of the feed gas. To maintain a stable inventory of $CO_2$ in the overall system, the remainder of stream $L_B$ is withdrawn as a waste stream $L_W$ which, as shown in the table, contains less than 0.01% of the original Kr.

The stages above the feed stage in column 11 concentrate the Kr in the $CO_2$ vapor. As shown, the Kr content of the vapor stream $V_a$ from the top of the column is 172 times that of the feed gas to the system. The vapor $V_a$ is liquefied in the condenser 12 and is refluxed as stream $L_R$ to the top of the stripper via a top inlet 23. A selected fraction of the reflux stream is withdrawn as the product stream $L_p$. In terms of the composition of the feed gas to the system, the product $L_p$ contains more than 99% of the original Kr, less than 1% of the $CO_2$, about 4% of the Xe, and less than 1% of the $O_2$ and $N_2$. The composition of stream $L_p$ is shown in the table.

Referring again to the absorption operation, the flow rate of the liquid $CO_2$ is made large enough to absorb virtually all (e.g., 99%) of the Kr but not so large as to absorb more than a selected percentage of the $O_2$ and $N_2$. In the absorption operation illustrated in FIG. 2, which provides a Kr decontamination factor of about 100, the L/V flow ratio is about 10 moles of $CO_2$ per mole of vapor. From the standpoint of quantitative removal of Kr, the minimum effective flow of absorbent is about 9 moles of $CO_2$ per mole of vapor, since the Kr/$CO_2$ vapor pressure ratio is about 9. If desired, additional Kr absorption can be achieved by increasing the column operating pressure or the flow of liquid $CO_2$. Either of these changes will, however, increase the amount of $O_2$ and $N_2$ carried to the fractionator in the absorbent stream $L_y$. Quantitative return of the resulting larger amounts of $O_2$ and $N_2$ in the recycle stream $G_c$ from the fractionator will increase the amount of Kr refluxing in the system. Increasing the number of absorption stages may be a preferred way of increasing Kr absorption since this increases the Kr decontamination factor without increasing the amount of $N_2$ and $O_2$ absorbed. For each tenfold increase in the decontamination factor, about five additional theoretical stages are required.

The absorption operation can be conducted over a wide range of temperatures and temperatures selected to maintain the $CO_2$ absorbent in the liquid phase. Throughout the entire process system, the pressure must be above 5.1 atmospheres and the temperature above $-56.6°C$ (the freezing point of $CO_2$ at that pressure). The separation factors between $O_2$ and Kr increase with decreasing temperature; thus, it is preferable to operate at a temperature (e.g., $-40°C$) approaching the minimum. The separation factors also increase with increasing pressure.

Referring to the fractionator 3, this contactor is designed to remove $O_2$ and more volatile gases dissolved in the liquid $CO_2$ absorbent received from the absorption column. In the fractionator, the vapor-to-liquid mole ratio is made large enough to remove the desired percentage (e.g., more than 99%) of these gases but not so large as to transfer more than a selected percentage of the Kr to the vapor. Kr transferred to the vapor places an additional burden on the absorption column, since part of the vapor is refluxed to that column as stream $G_c$. In the system shown, the Kr reflux to the absorption column from the fractionator is about 1.4 times the rate that Kr is introduced to the system in the feed gas. If preferred, the reflux of Kr can be reduced by decreasing the vapor-to-liquid mole ratio in the fractionator. This will, however, increase the number of stages required to completely remove the $O_2$ and $N_2$ from the absorbent. The seven-stage fractionator shown decreases $O_2$ in the liquid $CO_2$ to about 0.7% of its concentration in the feed gas. If desired, additional stages can be added to further decrease the amount of dissolved $O_2$. This will slightly increase the amount of Kr refluxed to the absorber. The fractionator is more effective in removing $N_2$ and $O_2$. Less Xe than Kr is refluxed from the fractionator to the absorber.

In the stripper 11, the two stages above the feed stage greatly concentrate the Kr in the reflux loop at the top of the stripper. Virtually all of the $O_2$ and $N_2$ coming from the fractionator also is concentrated in this loop. If a smaller reflux of Kr is preferred, the amount of vapor and liquid in these upper stages can be decreased. Alternatively, the vapor from the fractionator feed stage can be rectified in a small, separate column. A part of the vapor further enriched in krypton by rectification is recovered as product, as by condensation and withdrawal from the system.

An important feature of this process is that it effects quantitative recovery of the Kr in a form essentially free from more-volatile gases such as $O_2$ and $N_2$. This is achieved by employing both an absorption operation and a fractionation operation, with recycle, prior to the stripping operation. Merely absorbing before stripping poses the problem that the absorber can be operated to favor either good Kr recovery or a low $O_2$ content in the liquid leaving the absorber, but not both. That is, conditions effecting complete absorption of the Kr would also result in absorption of at least 20% of the $O_2$ present, whereas conditions effecting absorption of less than about 10% of the $O_2$ would not accomplish absorption of more than about 50% of the Kr.

It will be understood that the process conditions illustrated above are not necessarily the optimum and that it is within the scope of this invention to vary the process parameters as required to obtain a desired Kr decontamination factor, a selected Kr concentration in the product stream, a desired flow rate for the product stream, or the like. For example, in a system analogous to that shown in FIG. 2, a Kr decontamination factor of about 1,000 can be obtained with absorption, fractionation, and stripping columns having ten theoretical stages each and operating at about −20°C and 20 atmospheres. Assuming a feed gas comprising at least 90 mole % $CO_2$ and including up to 10 mole % $O_2$ plus $N_2$, as well as 1 to 100 ppm Kr, quantitative recovery of the Kr in low-volume form can be obtained within the following ranges of operating conditions:

| | | |
|---|---|---|
| Absorption zone: | temperature | −50° to 30°C |
| | pressure | 6 to 70 atm. |
| | L/V ratio | 3 to 20 |
| Fractionating zone: | temperature | −50° to 30°C |
| | pressure | 6 to 70 atm. |
| | L/V ratio | 5 to 30 |
| Stripping zone: | temperature | −50° to 30°C |
| | pressure | 6 to 70 atm. |
| | L/V ratio | 1.5 to 10 |

Referring to FIG. 2, other well-known types of liquid-gas contactors can be used if desired. For example, bubble-plate columns or packed columns with true countercurrent flow can be utilized. As further examples, spray towers or jet contactors might be used.

In the form of the process just described, the Xe is permitted to distribute throughout the process system. If desired, however, virtually all of the Xe can be concentrated in the product stream $L_p$, along with the Kr by utilizing a much larger stripper and employing liquid/vapor flow ratios of less than two in the stripper. This mode of operation will greatly increase the Kr reflux at the top of the stripper.

passing said gaseous fraction upwardly through an absorption zone in countercurrent contact with krypton-decontaminated liquid carbon dioxide absorbent ultimately derived from said two-phase mixture to preferentially transfer krypton into said absorbent;

separately withdrawing the resulting krypton-decontaminated gaseous effluent from said zone;

passing said liquid fraction and the krypton-enriched liquid absorbent from said absorption zone downwardly through a fractionating zone in countercurrent contact with carbon dioxide vapor ultimately derived from said two-phase mixture to transfer oxygen into said vapor;

recycling at least a part of the resulting oxygen-enriched gaseous effluent upwardly through said absorption zone;

feeding the resulting oxygen-depleted, krypton-containing liquid absorbent from said fractionating zone downwardly through a stripping zone in countercurrent contact with carbon dioxide vapor ultimately derived from said two-phase mixture to transfer krypton into said vapor;

recycling at least a part of the resulting krypton-decontaminated liquid absorbent downwardly through said absorption zone;

rectifying the resulting krypton-enriched vapor effluent from said stripping zone to provide a vapor stream further enriched in krypton; and recovering as product at least a part of said stream further enriched in krypton.

2. The method of claim 1 wherein said gas mixture is compressed and cooled under conditions liquefying a major portion thereof.

3. The method of claim 1 wherein each of said absorption zone, fractionating zone, and stripping zone is maintained at a pressure in the range of about 5.2 to 70 atmospheres and a temperature in the range of from about −57° to 30°C.

TABLE

| | Liquid phase* | | | | | | Vapor phase | | | | | |
|---|---|---|---|---|---|---|---|---|---|---|---|---|
| | Stream composition (moles) | | | | | | | Stream composition (moles) | | | | |
| Stream | Total | $CO_2$ | $O_2$ | $N_2$ | Kr | Xe | Stream | Total | $CO_2$ | $O_2$ | $N_2$ | Kr | Xe |
| | | | | | | | Feed gas | 1.00 | 0.897 | 0.0750 | 0.0280 | K | X |
| $L_F$ | 0.738 | 0.7266 | 0.00928 | 0.00251 | 0.315K | 0.734X | $G_F$ | 0.262 | 0.1704 | 0.0657 | 0.0255 | 0.685K | 0.266X |
| $L_{SB}$ | 5.00 | 5.00 | $<10^{-10}$ | $<10^{-10}$ | 0.0008K | 4.82X | | | | | | | |
| $L_7$ | 5.24 | 5.16 | 0.0695 | 0.0155 | 0.811K | 5.07X | $G_7$ | 0.537 | 0.349 | 0.1445 | 0.0435 | 0.516K | 0.531X |
| $L_9$ | 5.24 | 5.16 | 0.0695 | 0.0155 | 2.10K | 5.22X | $G_9$ | 0.537 | 0.349 | 0.1445 | 0.0435 | 1.316K | 0.548X |
| | | | | | | | $G_F+G_C$ | 0.538 | | | | 2.11K | 0.678X |
| $L_C$ | 0.219 | 0.216 | 0.00313 | 0.00050 | 0.184K | 0.320X | $G_C$ | 0.275 | 0.1786 | 0.0788 | 0.0180 | 1.421K | 0.412X |
| $L_9+L_F+L_C$ | 6.20 | 6.10 | 0.0819 | 0.01580 | 2.60K | 6.27X | | | | | | | |
| $L_1$ | 6.20 | 3.20 | 0.00104 | 0.000027 | 1.661K | 6.23X | $g_1$ | 0.495 | 0.493 | 0.00195 | 0.000069 | 1.035K | 0.729X |
| $L_{FB}$ | 5.705 | 5.705 | 0.000515 | 0.000010 | 0.991K | 5.54X | $g_B$ | 0.495 | 0.494 | 0.00104 | 0.000027 | 0.671K | 0.696X |
| $L_P$ | 0.00897 | 0.00844 | 0.000515 | 0.00001 | 0.9905K | 0.037X | | | | | | | |
| $L_R$ | 1.551 | 1.460 | 0.0890 | 0.00173 | 171.2K | 6.44C | | | | | | | |
| $L_{S1}$ | 7.25 | 7.25 | $<10^{-6}$ | $<10^{-6}$ | 0.0033K | 7.83X | $V_1$ | 1.56 | 1.560 | $<10^{-6}$ | $<10^{-6}$ | 0.0065K | 2.60X |
| $L_B$ | 5.70 | 5.70 | $<10^{-10}$ | $<10^{-10}$ | 0.0009K | 5.50X | $V_B$ | 1.56 | 1.560 | $<10^{-6}$ | $<10^{-6}$ | 0.0023K | 2.33X |
| $L_W$ | 0.696 | 0.696 | $<10^{-10}$ | $<10^{-10}$ | 0.0001K | 0.673X | | | | | | | |

*Liquid and Vapor Phases on the same line are in equilibrium. Basis: 1 mole of contaminated burner gas per unit of time.

We claim:

1. A method for recovering krypton in highly concentrated form from a gas mixture constituted mainly of carbon dioxide and including a relatively small percentage of oxygen as well as a trace amount of krypton comprising:

compressing and cooling said gas mixture to convert the same to a two-phase mixture including a gaseous fraction and a liquid fraction, both fractions containing carbon dioxide, oxygen, and krypton;

separating said gaseous fraction and liquid fraction;

4. The method of claim 1 wherein the liquid-to-gas-phase flow rate ratio in said absorption zone is in the range of from about 3 to 20.

5. The method of claim 1 wherein the liquid-to-gas phase flow rate ratio in said fractionating zone is in the range of from about 5 to 30.

6. The method of claim 1 wherein the liquid-to-gas-phase flow rate ratio in said stripping zone is in the range from about 1.5 to 10.

7. The method of claim 1 wherein a part of said oxygen-enriched gaseous effluent from said fractionating zone is cooled to form a condensate which is recycled downwardly through said fractionating zone.

8. The method of claim 1 wherein said carbon dioxide vapor contacted in said fractionating zone is generated by distillation of said oxygen-depleted absorbent from said fractionating zone.

9. The method of claim 1 wherein part of said krypton-decontaminated liquid from said stripping zone is separately discharged as waste.

10. The method of claim 1 wherein said vapor stream further enriched in krypton is condensed and a part of the resulting condensate is withdrawn as said product.

* * * * *